No. 732,053. PATENTED JUNE 30, 1903.
S. C. DAVIDSON.
DETACHABLE BEARING FOR SHAFTS.
APPLICATION FILED MAY 3, 1902.
NO MODEL. 3 SHEETS—SHEET 1.
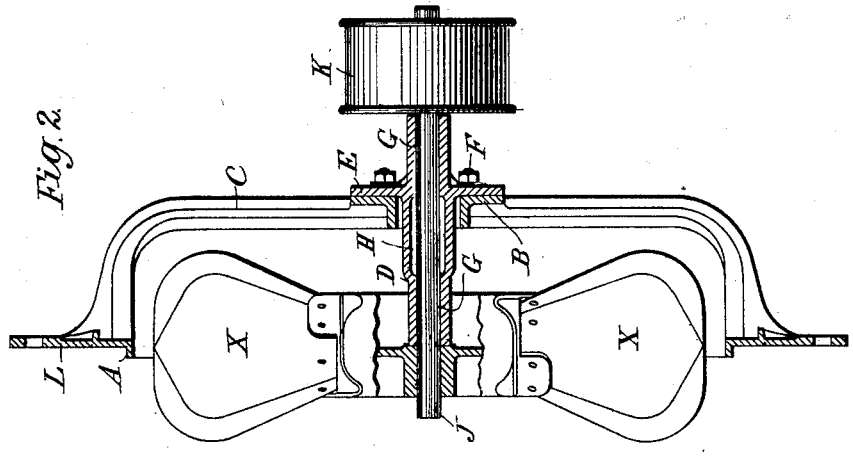
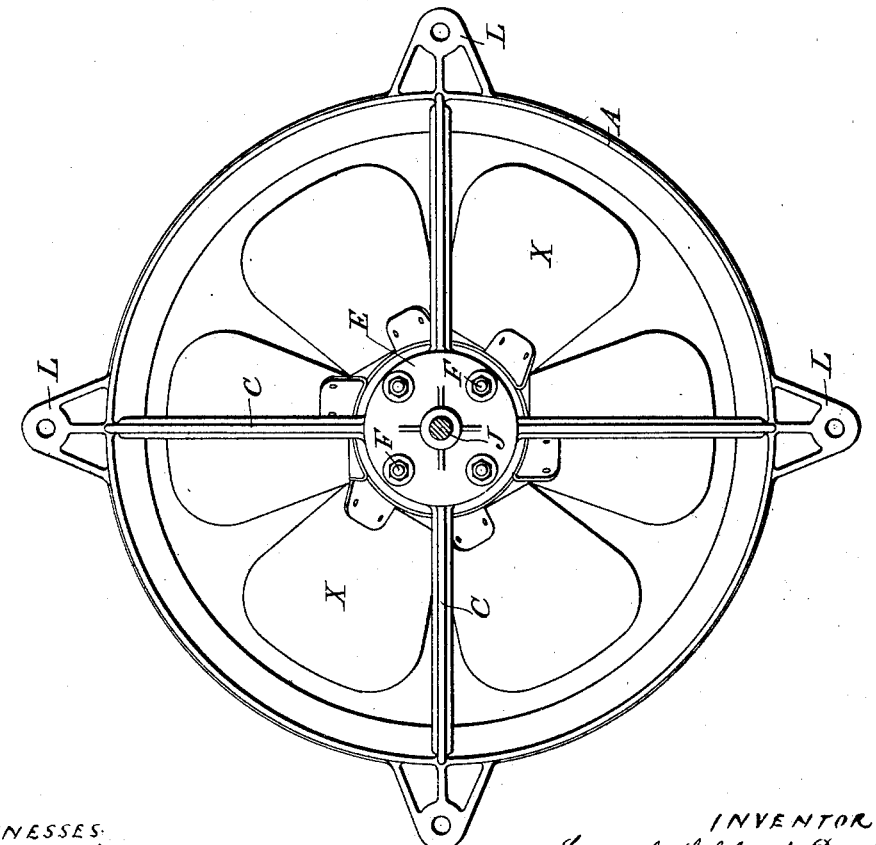
WITNESSES
Fred White
Thomas F. Wallace
INVENTOR
Samuel Cleland Davidson
By his Attorneys No. 732,053. PATENTED JUNE 30, 1903.
S. C. DAVIDSON.
DETACHABLE BEARING FOR SHAFTS.
APPLICATION FILED MAY 3, 1902.
NO MODEL. 3 SHEETS—SHEET 2.

WITNESSES
Fred White
Thomas F. Wallace

INVENTOR:
Samuel Cleland Davidson,
By his Attorneys

No. 732,053. PATENTED JUNE 30, 1903.
S. C. DAVIDSON.
DETACHABLE BEARING FOR SHAFTS.
APPLICATION FILED MAY 3, 1902.
NO MODEL. 3 SHEETS—SHEET 3.
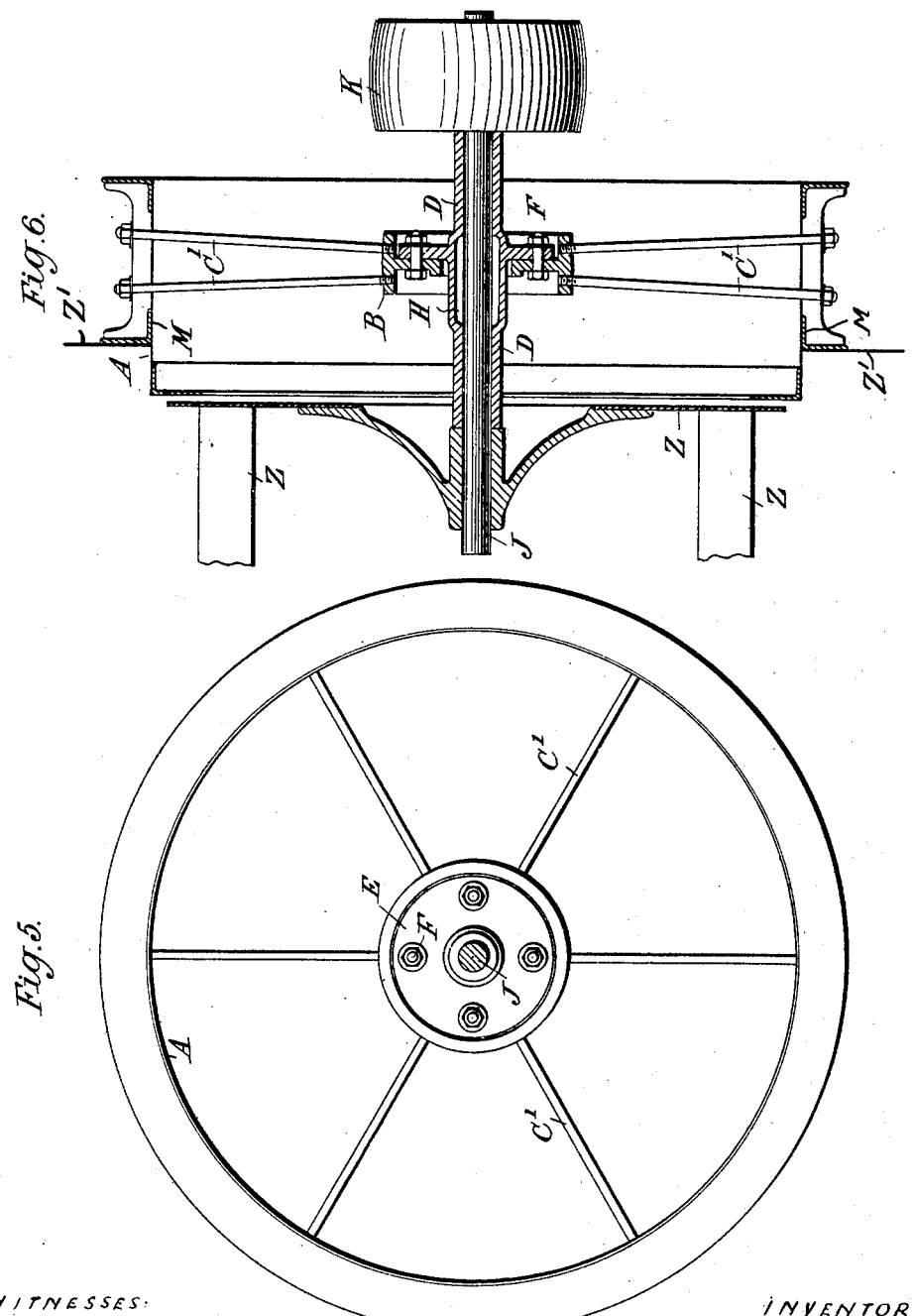

No. 732,053.

Patented June 30, 1903.

UNITED STATES PATENT OFFICE.

SAMUEL CLELAND DAVIDSON, OF BELFAST, IRELAND.

DETACHABLE BEARING FOR SHAFTS.

SPECIFICATION forming part of Letters Patent No. 732,053, dated June 30, 1903.

Application filed May 3, 1902. Serial No. 105,814. (No model.)

*To all whom it may concern:*

Be it known that I, SAMUEL CLELAND DAVIDSON, a subject of the King of Great Britain and Ireland, residing in Belfast, Ireland, have invented certain new and useful Improvements in Detachable Bearings for Shafts, of which the following is a specification.

My invention relates to detachable bearings and supporting-brackets for rotating shafts or spindles which have their driving and driven ends oppositely projecting beyond the extremities of the bearing, and is especially applicable to short shafts or spindles for fans.

The objects of my invention are to so construct a detachable bearing and its supporting-bracket that the combination is simple and cheap to manufacture and efficient in operation and that even if put together by inexperienced workmen it will always have the shaft running freely and in true alinement in the bearings, which bearings are at the same time capable of resisting the pull of the driving-belt with sufficient rigidity to prevent detrimental deflection of the axis of the shaft.

The accompanying drawings illustrate several forms of the invention, and in all the figures like letters refer to similar parts.

Figure 4:
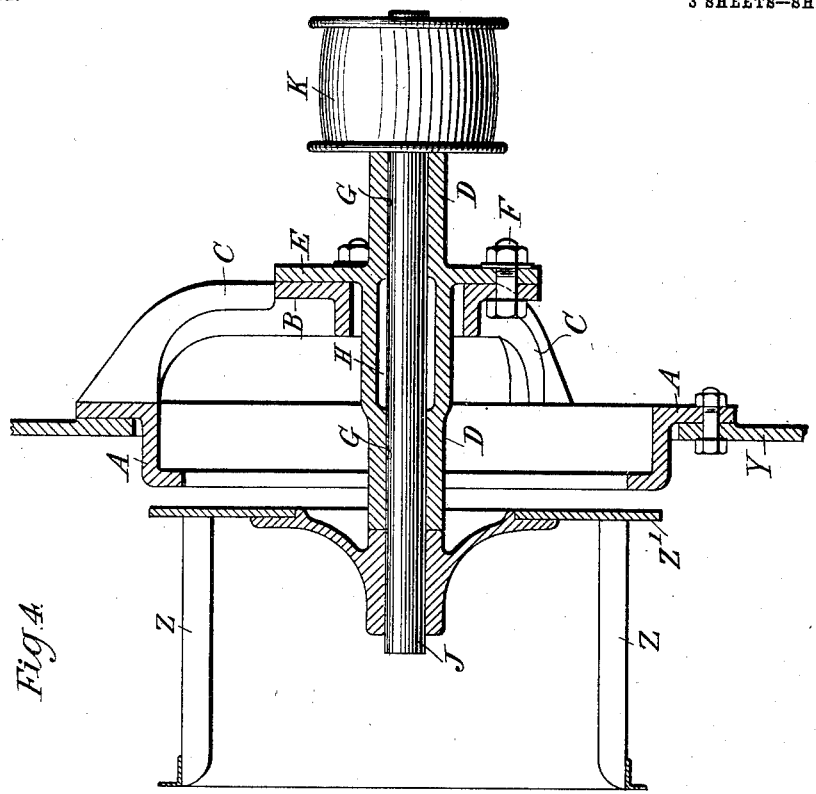
Figure 3:
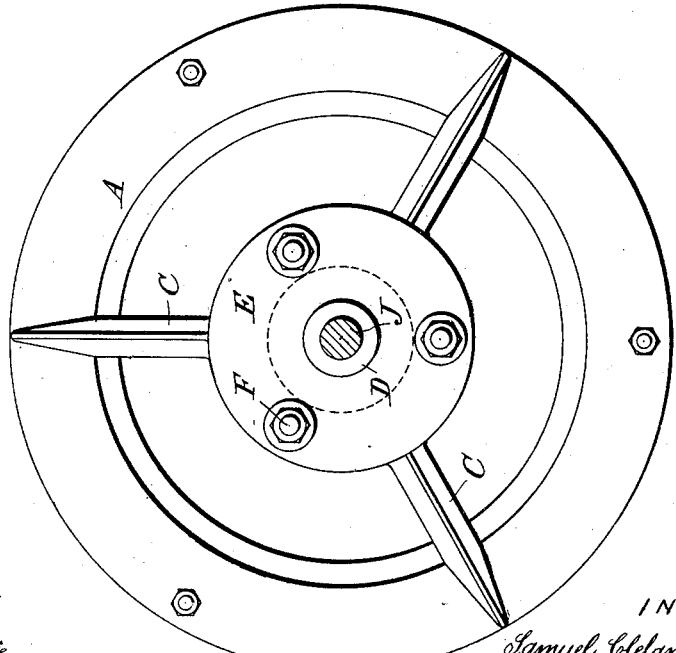

Figures 1 and 2 are respectively an end elevation and side sectional elevation showing the invention applied to the mounting of a propeller-fan. Figs. 3 and 4 are similar views to Figs. 1 and 2, showing the invention applied to the mounting of a centrifugal fan. Figs. 5 and 6 are similar views to Figs. 1 and 2, showing a modified form of the invention applied to the mounting of a centrifugal fan.

My improved bearing comprises two principal parts—namely, a rigid bearing-sleeve having a radial flange at about its middle and a supporting frame or bracket having a central annular disk to which said flange is bolted and having outwardly-extending arms for connecting said disk to the outer support of the frame or bracket.

Referring to the drawings, A designates the outer portion of the frame or bracket, which is usually constructed, preferably, of annular form.

B is the central disk of this frame, and C represents its arms, extending from this disk outwardly to and joining the outer or annular portion A.

D is the tubular bearing-sleeve, formed around its exterior with a flange E in a plane perpendicular to the axis of the bearing-sleeve. This flange is connected to the central disk B by bolts F F.

G G are the bearings or bearing-surfaces in which the shaft J revolves within the opposite end portions of the sleeve, and H is an intervening chambered-out or enlarged portion within the middle portion of the sleeve.

K is the driving-pulley, fixed on one end of the shaft J, its other end carrying a fan or other rotary driven part.

In Figs. 1 and 2 the structure is shown as adapted for the mounting of a propeller-fan X. The outer ring A of the frame is provided with external lugs L L for bolting it to a framework or partition. The outer ring A is shown as arranged in the plane of the middle of the fan, (see Fig. 2,) the connecting arms or spokes C C being bent as shown.

Figs. 3 and 4 show a construction adapted as the mounting of a centrifugal fan Z, the outer ring A being adapted for attachment to a wall Y, which may form part of the casing of the fan. In this case three arms or spokes C C are employed, which may be curved as shown.

In Figs. 5 and 6 is shown another modification, in which the inner disk B and outer ring A of the supporting-frame are connected by radial stays or tension-rods C'. The outer ring A is adapted for attachment to the casing Z' of the fan through the medium of angle-rings M.

It is characteristic of my invention that the bearing-sleeve D is made rigid, so as to hold the bearings G G in absolute alinement, also that the opening within the disk or annular plate B is larger than the exterior of the bearing-sleeve where the latter passes through it, so that it freely admits the sleeve without contact therewith. It results from this that no finish is required upon either of the castings, which contact only at the flat faces of the flange E and disk B and are united only by the bolts F F. Hence the two main parts of the bearing are readily interchangeable without requiring any fitting, so that if the bearing-sleeve wears out and requires replacement a new one can be readily applied in its place, or if the outer frame should become broken a duplicate can be readily fitted in its place and the bearing-sleeve applied thereto. The bearing-flange E is located near the middle of the sleeve D or preferably somewhat nearer to the driving-pulley end, so as to reduce the leverage due to the pull of the belt, and thereby minimize any tendency of this end of the bearing being pulled out of true alinement with the opposite end.

It is characteristic of my invention that the supporting frame or bracket affords a slightly elastic or yielding support for the rigid bearing-sleeve. This elasticity resides chiefly in the arms C C or in their substitutes the radial ties C' C'. By reason of this elasticity the shaft and its rigid bearing are permitted to adjust themselves to the pull or strain upon the shaft. Thus the shaft may be slightly tilted or deflected by the pull of the driving-belt, the arms of the bracket yielding or springing a little, while by the rigidity of the bearing-sleeve the bearing-surfaces remain always in true alinement and the shaft continues to revolve freely therein without tendency to curvature, so that liability to friction and heating is avoided. The mounting of the fan or other driven part is sufficiently free to allow for any tilting or deflection and also to allow for any variance between different castings for the frame or bracket and the bearing-sleeve, so that any castings of these parts may be united without requiring machine finishing or fitting, thereby greatly cheapening the structure as compared with bearings which require such fitting.

A further advantage of my improved combination of bearing and bracket is that while the bracket remains a fixture the bearing can be changed to suit different diameters of shaft as required, as the orifice in the center of the bracket may be sufficiently large to admit bearings of large diameter and at the same time be equally suitable for smaller diameters, provided the bearing-flanges on the latter are made of sufficient diameter to connect up properly to the bracket.

What I claim, and desire to secure by Letters Patent, is—

1. A tubular rigid bearing-sleeve having an outer flange at about its middle, combined with a supporting-frame, having a central annular disk with an opening so large as to freely admit said sleeve through it without contact therewith, and said flange bolted to said disk.

2. A tubular rigid bearing-sleeve having an outer flange at about its middle, combined with a supporting-frame, having a central annular disk to which said flange is bolted, and having slightly-elastic arms extending outward from said disk to an outer support.

In witness whereof I have hereunto signed my name in the presence of two subscribing witnesses.

SAMUEL CLELAND DAVIDSON.

Witnesses:
WILLIAM FREW,
HUGH TAYLOR COULTER.